US006795077B2

(12) United States Patent
Pasquier

(10) Patent No.: US 6,795,077 B2
(45) Date of Patent: Sep. 21, 2004

(54) SYSTEM FOR PROCESSING GRAPHIC PATTERNS

(75) Inventor: Laurent Charles Pasquier, Asnieres-sur-Seine (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 157 days.

(21) Appl. No.: 10/073,774

(22) Filed: Feb. 11, 2002

(65) Prior Publication Data

US 2002/0164076 A1 Nov. 7, 2002

(30) Foreign Application Priority Data

Feb. 13, 2001 (FR) .......................................... 01 01945

(51) Int. Cl.[7] .......................................... G06F 15/76
(52) U.S. Cl. .......................................... 345/519
(58) Field of Search .......................................... 345/519, 547, 345/501, 530, 601, 558, 560, 531, 602, 555; 382/232

(56) References Cited

U.S. PATENT DOCUMENTS 5,805,175 A 9/1998 Priem .......................... 345/509
5,815,137 A 9/1998 Weatherford et al. ........ 345/145
5,821,918 A 10/1998 Reinert et al. .............. 345/154
5,831,677 A * 11/1998 Streater .................. 375/240.12
5,867,178 A 2/1999 Murphy et al. ............. 345/507
5,883,670 A 3/1999 Sporer et al. ............... 348/384
6,043,829 A 3/2000 Inoue .......................... 345/519
6,573,905 B1 * 6/2003 MacInnis et al. ........... 345/629

* cited by examiner

*Primary Examiner*—Kee M. Tung
(74) *Attorney, Agent, or Firm*—Michael J. Ure

(57) ABSTRACT

The present invention relates to an integrated circuit and a method of processing graphic patterns comprising pixels. The circuit (CH) is integrated in a video output co-processor. The circuit comprises, on the one hand, a random access memory (RAM) intended to save the patterns and, on the other hand, extraction means (PE) intended to extract pixels as a function of an indication of the number of bits per pixel from the selected pattern and apply them to encoding means (CM). The pixels are then color-characterized by encoding means (CM) for display on a video screen. The circuit avoids the use of an external memory (SDRAM) and thus cluttering of the passband of the video bus.

17 Claims, 5 Drawing Sheets

SYSTEM FOR PROCESSING GRAPHIC PATTERNS

Figure 1:
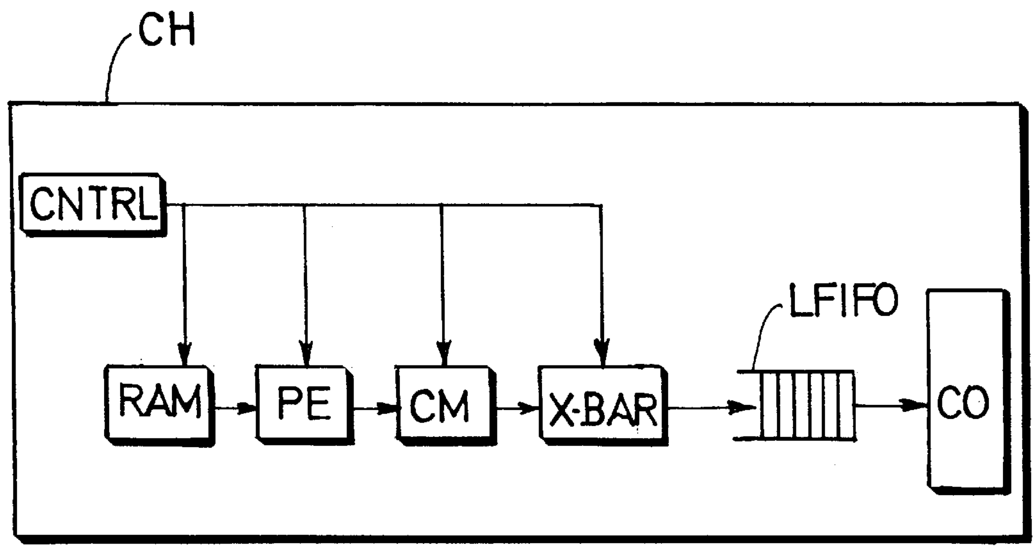

The present invention relates to an integrated circuit for processing sets of data, said sets of data comprising pixels. The invention also relates to a method of processing sets of data, adapted to said circuit. The invention is particularly applicable in the field of digital television.

U.S. Pat. No. 5,883,670 describes an integrated circuit for processing images in a video processor. The circuit is connected to a computer. A volatile memory, for example, a SDRAM of the order of several megabytes is associated with this computer. The circuit comprises image decoding means. Image sequences which arrive through a video channel are saved and processed in the memory as the images are decoded. A standard bus of the PG type is used for the circuit to access said memory.

In said field of digital television, sets of data such as graphic patterns (icons, characters, etc.) are often used and superimposed on images. For example, characters are used during a visual on-screen translation of a film into a foreign language. For processing an image with such patterns, the following steps are carried out:

- saving the sequences of encoded images from the video channel and patterns in the SDRAM memory,
- processing a sequence of images:
  - reading a sequence of images in the SDRAM volatile memory,
  - decoding the sequence of images,
  - writing the sequence of images thus decoded into the SDRAM memory,
  - reading the sequence of images in order to perform a step of correcting errors which are inherent in encoding images by means of a dedicated co-processor (correction currently referred to as post-processing),
  - rewriting of the improved image into the SDRAM memory,
- processing of patterns:
  - reading patterns in the SDRAM volatile memory,
  - processing patterns by means of a dedicated graphic co-processor,
  - rewriting patterns into the SDRAM memory,
- reading, by the video processor, the sequence of images and patterns thus processed,
- composition, by said processor, of the image to be displayed with said sequence and said patterns,
- display of the image composed by a video output co-processor.

A decoded sequence of images occupies 20 Mbytes per second (a byte comprises 8 bits) in the normal definition and 124 Mbytes in the high definition, in accordance with one of the possibilities of the ATSC standard (Advanced Television Standards Committee). Consequently, for generating a sequence of images as described hereinbefore, there is more than 100 Mbytes/s=(2+2+1)*20 of passband required for images in the normal definition and more than 620 Mbytes/s=(2+2+1)*124 of passband for images in the high definition (two reading operations, two writing operations for decoding and improvement, one reading operation for the composition) without counting the processing of different patterns. If the system described above is used for processing an image with patterns, there is a risk of numerous times of access to the SDRAM memory, an overload at the level of the data bus and consequently a considerable cluttering of the passband.

A technical problem to be solved by the object of the present invention is to propose an integrated circuit for processing sets of data in an image, said sets of data comprising pixels, as well as an associated method, particularly allowing a reduction of the access time to the memory and reducing cluttering of the passband.

In accordance with a first object of the present invention, a solution to the technical problem posed is characterized in that the integrated circuit comprises:

- an only memory suitable for saving at least a set of data comprising a number of pixels having a size varying from one type of set to another,
- means for controlling pixels, suitable for giving an indication of the type of a set of data,
- means for extracting pixels, suitable for selecting and reading said set of data, extracting at least a pixel of said set of data at the output of said memory as a function of said indication, and dispatching said at least one pixel to encoding means.

In accordance with a second object of the present invention, this solution is characterized in that the method of processing sets of data comprises the steps of:

- saving in an only memory at least a set of data comprising a number of pixels having a size varying from one type of set to another,
- giving an indication of the type of a set of data,
- selecting and reading said set of data,
- extracting at least a pixel of said set of data at the output of said memory as a function of said indication,
- dispatching said at least one pixel to encoding means.

As we will see in details hereinafter, said sets of data are processed in real time by virtue of the means for controlling and extracting the pixels and encoding, by performing the reading operations of the sets of data in the memory of the integrated circuit without having to use an external memory. The access to the memory are thus reduced and, consequently, the passband is less cluttered up.

These and other aspects of the invention are apparent from and will be elucidated, by way of non-limitative example, with reference to the embodiment(s) described hereinafter.

Figure 2:
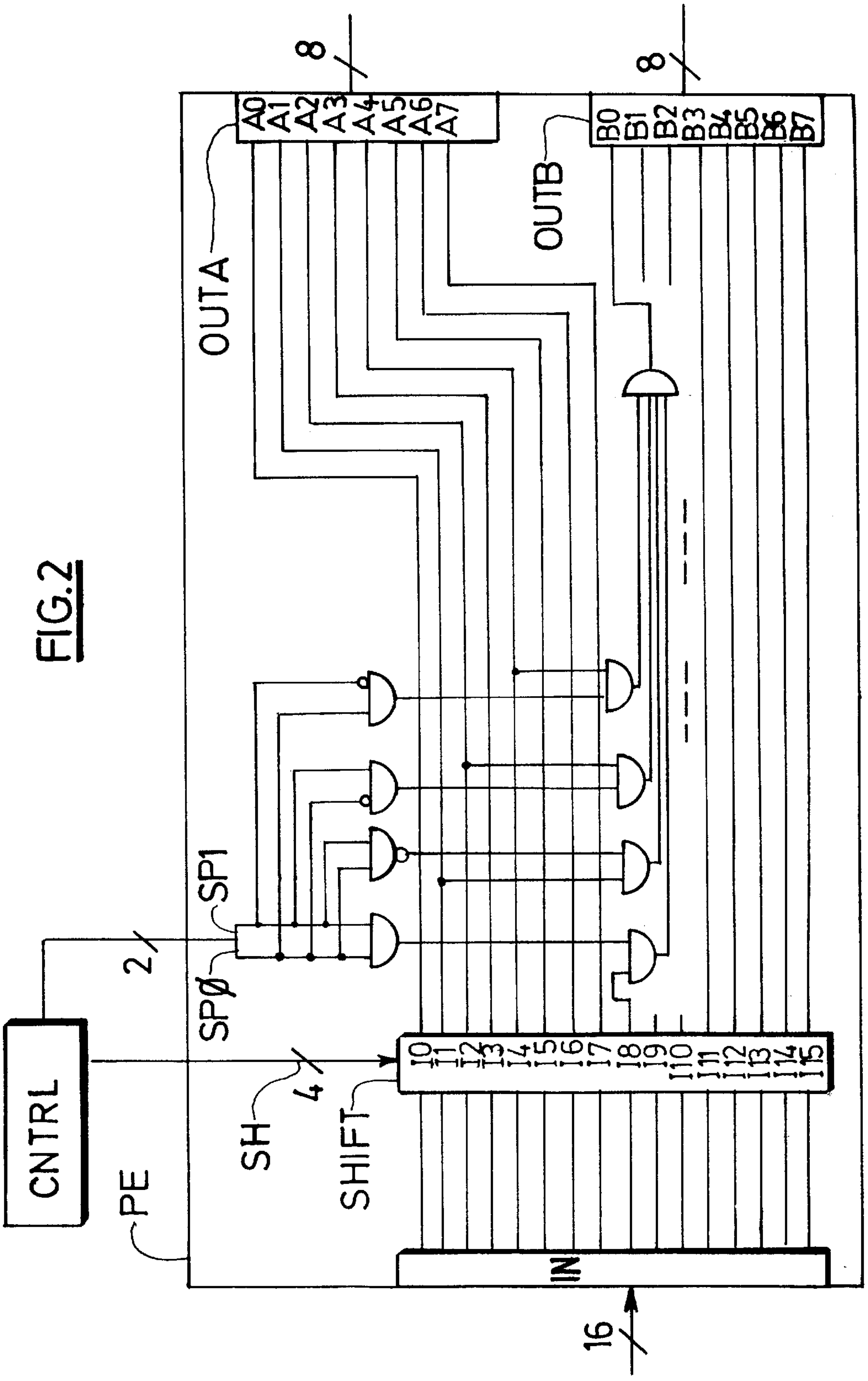
Figure 3:
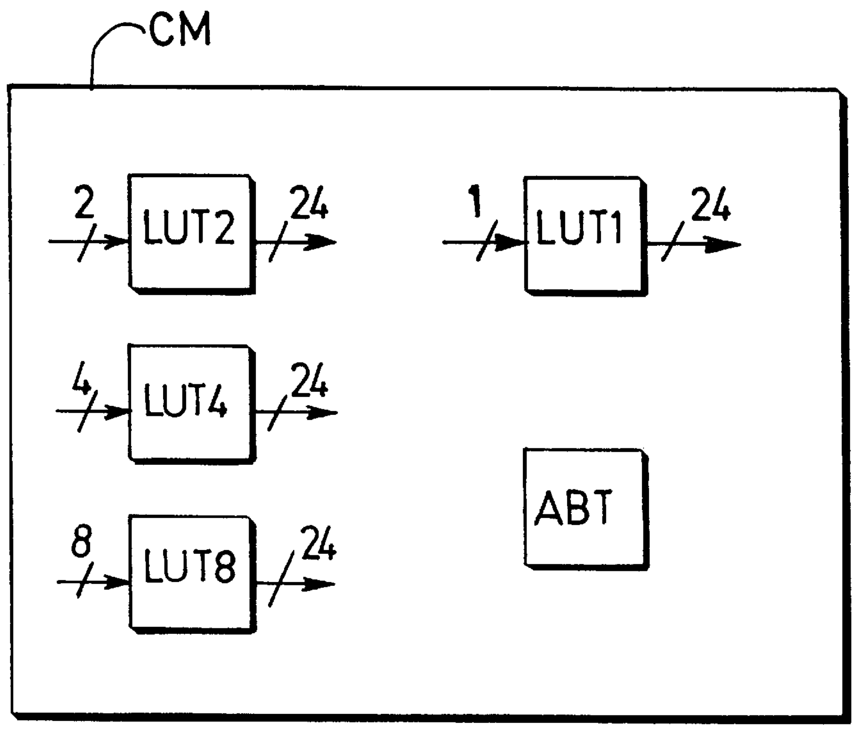
Figure 4:
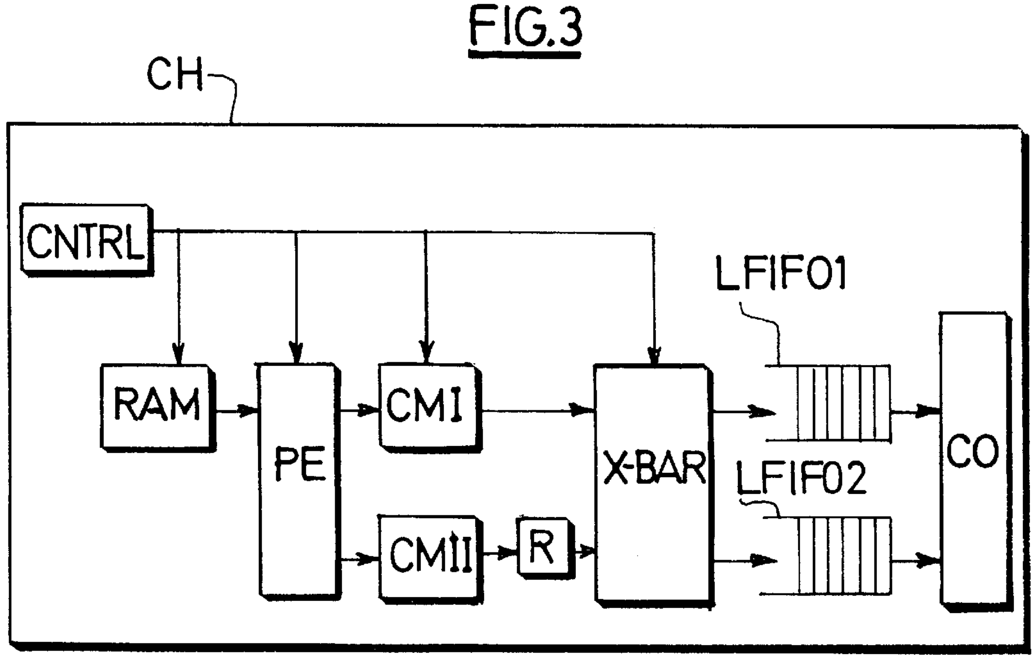
Figure 5:
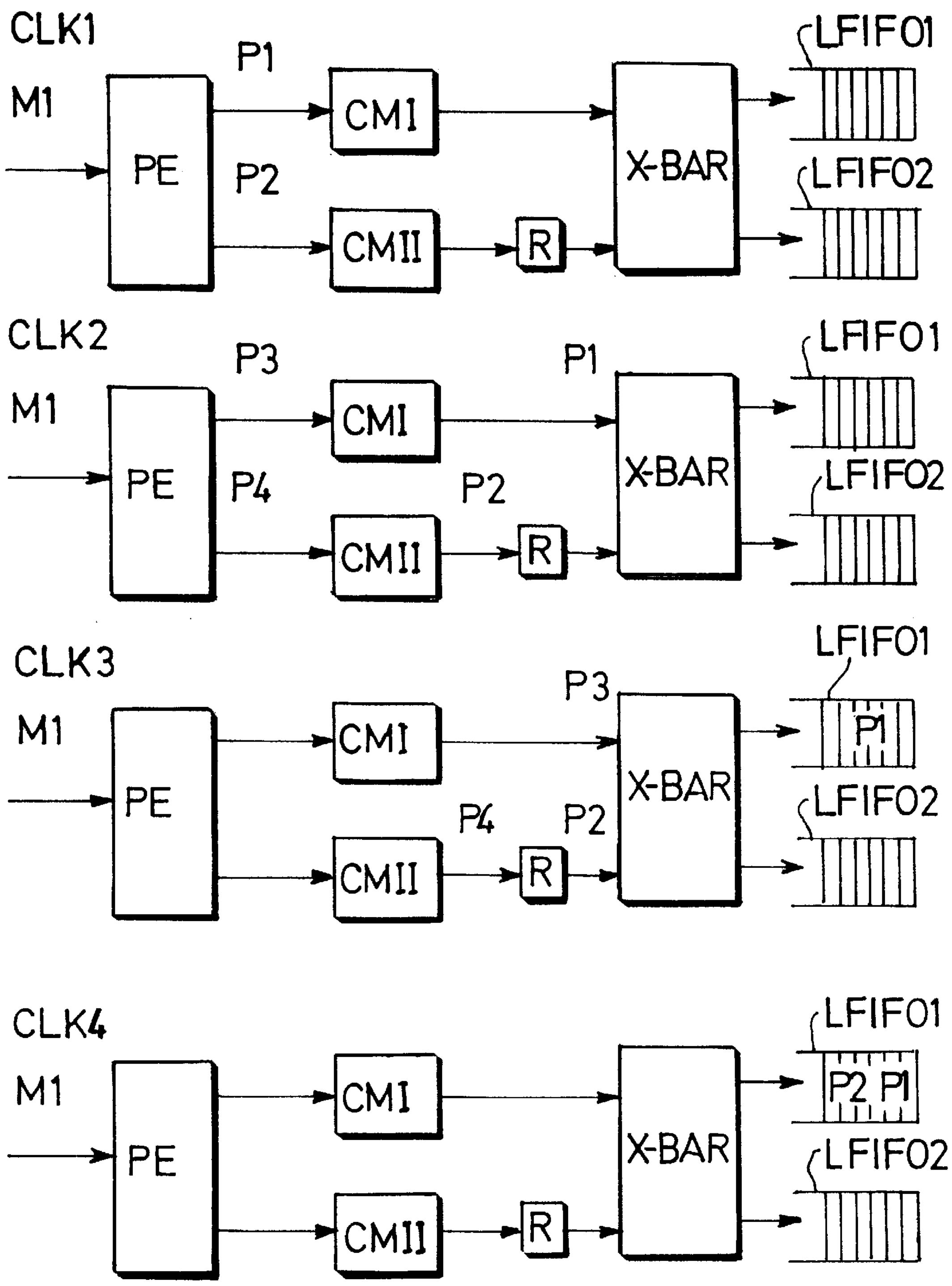
Figure 6:
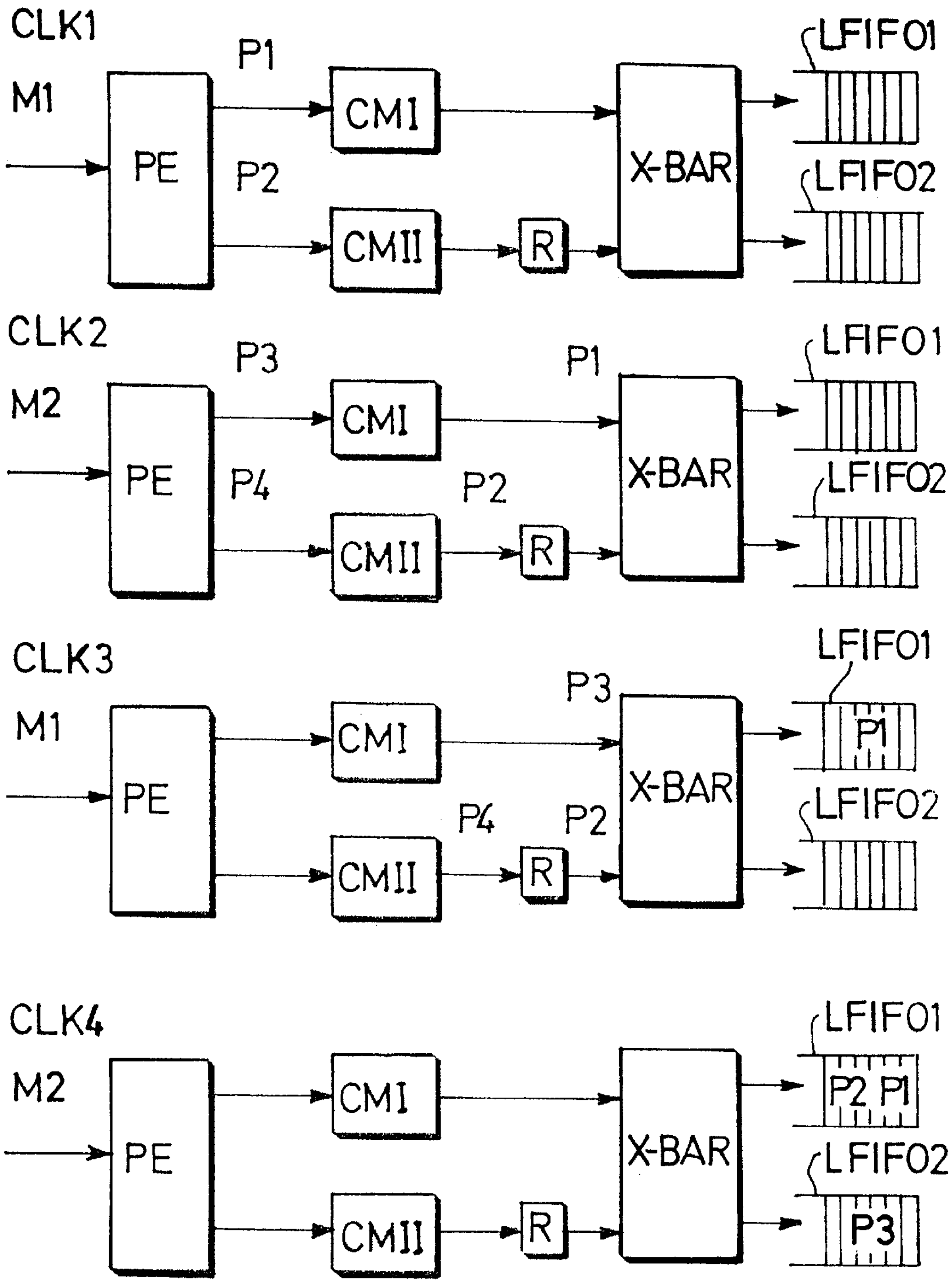

In the drawings:

FIG. 1 shows diagrammatically a structure of the integrated circuit according to the invention, FIG. 2 shows a non-limitative embodiment of the extraction means in the integrated circuit of FIG. 1, FIG. 3 is a circuit of the encoding means in the integrated circuit of FIG. 1, FIG. 4 shows a non-limitative embodiment of the integrated circuit of FIG. 1, FIG. 5 illustrates diagrammatically a first mode of operation of a part of the integrated circuit of FIG. 1, FIG. 6 illustrates diagrammatically a second mode of operation of a part of the integrated circuit of FIG. 1.

The present explanation of the invention relates to an example of the circuit used in the field of television. FIG. 1 shows a diagram of a structure of the integrated circuit CH. In our example, the integrated circuit CH is comprised in a television system particularly comprising a display screen, a clock CLK and a video output processor (not shown). Preferably, said circuit is comprised in a video output co-processor. The integrated circuit CH comprises means CNTRL for controlling pixels, for example a classic control means, an only memory RAM, means PE for extracting the pixels, encoding means CM and an image composing means CO. It also comprises means X-BAR for switching the pixels and queuing means LFIFO for the pixels. The pixels are comprised in a set of data which are preferably graphic patterns. A graphic pattern comprises a certain number of pixels and each pixel comprises a given number of bits. There are several types of patterns. In accordance with the type of pattern, the number of bits varies for a pixel. In other words, the pixels may be encoded in a number of variable bits. Thus, for a character pattern, each pixel comprises 1 bit, while for an icon pattern each pixel may generally comprise 2, 4, 8 or 16 bits.

When a television system is initialized, graphic patterns stored in an external memory to the integrated circuit CH, for example, an EEPROM re-inscribable non-volatile memory (not shown), are transmitted to the volatile memory RAM of said circuit. Note that by thus storing patterns in such an external memory, the external memory can be preprogrammed with variable patterns in accordance with the needs of a provider or user of said television system. At least a pattern comprising a number of pixels having a size which varies from one type of set to another may thus be transmitted and saved in the volatile memory RAM.

To display patterns in an image on the display screen, the following steps are performed.

In a first step, the control means CNTRL control the pixel extraction means PE by giving them the number of patterns to be processed and by also giving an indication of the type of pattern from which the pixels must be extracted from said memory, a type of pattern corresponding to the number of bits per pixel of the pattern. Said control is performed by virtue of a reference table (not shown) particularly comprising the type of each pattern saved in the memory RAM, the number of pixels per pattern. It will be noted that, for generating different sizes of pixels, the memory RAM preferably comprises an output sequence of a size which is larger than or equal to the maximum number of bits per pixel that can be found in a pattern, here 16 bits, where the size of the memory is, for example, 15 kbytes.

In a second step, the pixel extraction means PE select a first pattern in the volatile memory RAM, read said pattern and extract at least a pixel of said pattern at the output of said memory as a function of said indication of the type and the size of the output sequence of the memory RAM. Subsequently, said extraction means PE dispatch said at least one pixel to encoding means CM. For example, if there is an icon pattern comprising four pixels of 8 bits each, the extraction means PE extract two pixels of 8 bits from the output sequence of 16 bits of the memory RAM. Subsequently, said means apply the two pixels to the encoding means CM.

In accordance with a non-limitative embodiment, the pixel extraction means PE comprise bit shifting means SHIFT, such as shift registers, and logic circuits allowing extraction and dispatch of the pixels. In accordance with the example of FIG. 2, the extraction means PE allow management of the pixels of 1, 2, 4 or 8 bits. These means comprise an input IN, which can receive 16 bits, and 2 outputs OUTA and OUTB which can receive 8 bits each. A pixel is dispatched to one of these two outputs. As has been explained hereinbefore, the control means CNTRL supply an indication of the type to the extraction means PE. This indication is encoded in 2 bits SP0 and SP1 in the following manner:

SP0=0, SP1=0 for a pixel encoded in 1 bit,

SP0=0, SP1=1 for a pixel encoded in 2 bits,

SP0=1, SP1=0 for a pixel encoded in 4 bits,

SP0=1, SP1=1 for a pixel encoded in 8 bits.

The control means CNTRL also indicate, in accordance with the indication of the type, by means of the shift bits SH, the shift which is to be performed on the input bits in order to be able to switch them to the two outputs OUTA and OUTB of the extraction means PE and, consequently, to the adequate encoding means CM. The shift means SHIFT receive the different bits read in the volatile memory RAM and shift them as a function of the shift bits SH. Up to 16 bits I0 to I15 may be present at the output of the shift means SHIFT.

The outputs OUTA and OUTB of the extraction means PE may assume the values of the bits indicated in the following two Tables.

Output OUTA

| Type of pattern (number bits/pixel) | Indication of type | A0 | A1 | A2 | A3 | A4 | A5 | A6 | A7 |
|---|---|---|---|---|---|---|---|---|---|
| 1 | (SPO, SP1) = (0,0) | I0 | | | | | | | |
| 2 | (SPO, SP1) = (0,1) | I0 | I1 | | | | | | |
| 4 | (SPO, SP1) = (1,0) | I0 | I1 | I2 | I3 | | | | |
| 8 | (SPO, SP1) = (1,1) | I0 | I1 | I2 | I3 | I4 | I5 | I6 | I7 |

Output OUTB

| Type of pattern (number bits/pixel) | Indication of type | B0 | B1 | B2 | B3 | B4 | B5 | B6 | B7 |
|---|---|---|---|---|---|---|---|---|---|
| 1 | (SPO, SP1) = (0,0) | I1 | | | | | | | |
| 2 | (SPO, SP1) = (0,1) | I2 | I3 | | | | | | |
| 4 | (SPO, SP1) = (1,0) | I4 | I5 | I6 | I7 | | | | |
| 8 | (SPO, SP1) = (1,1) | I8 | I9 | I10 | I11 | I12 | I13 | I14 | I15 |

Consequently, we have an encoding logic for the circuits which is as follows:

$\mathrm{A0=I0;\ A1=I1;\ A2=I2;\ A3=I3;\ A4=I4;\ A5=I5;\ A6=I6;\ A7=I7}$ $\mathrm{B0=I1.(\overline{SP0+SP1})+I2.\overline{SP0}.SP1+I4.SPO.\overline{SP1}+I8.SP0SP1;}$ $\mathrm{B1=I3.\overline{SPO}.SP1+I5.SPO.\overline{SP1}+I9.SPO.SP1;}$ $\mathrm{B2=I6.SPO.\overline{SP1}+110.SPO.SP1;}$ $\mathrm{B3=I7.SPO.\overline{SP1}+111.SPO.SP1;}$ $\mathrm{B4=I12;}$ $\mathrm{B5=I13;}$ $\mathrm{B6=I14;}$ $\mathrm{B7=I15.}$ FIG. 2 shows an example of the encoding logic, particularly for the first output OUTA and for a first element B0 of the second output OUTB. For example, if the number of bits per pixel is 4, they are managed in the following manner:

- reading of 16 bits in the volatile memory RAM,
- the control means CNTRL send the indication of the type SP0=1, SP1=0 and the shift bits SH of the value 0 to the circuits of the extraction means PE,
- at the outputs I0 to I3 of the shift means SHIFT, the four first bits corresponding to a first pixel are dispatched to the output OUTA,
- in parallel, at the outputs I4 to I7 of the shift means SHIFT, the four subsequent bits corresponding to a second pixel are dispatched to the output OUTB,
- re-reading of the same 16 bits in the volatile memory RAM,
- the control means CNTRL send the indication of the type SP0=1 , SP1=0 and the shift bits SH of the value 8 to the circuits of the extraction means PE (here 4 shift bits encoded 1 0 0 0 , respectively), shifting of the eight bits on the right, at the outputs I0 to I3 of the shift means SHIFT, the four first bits corresponding to a third pixel are dispatched to the output OUTA, in parallel, at the outputs I4 to I7 of the shift means SHIFT, the four subsequent bits corresponding to a fourth pixel are dispatched to the output OUTB, and so forth.

The pixels are dispatched to the encoding means CM.

It will be noted that the shift means SH have the object of simplifying the logic of the circuits. Moreover, it will be noted that in this embodiment, the words read (16 bits each) are encoded in such a way that the first byte comprises the least significant bits and is encoded on the right while the second byte comprises the most significant bits and is encoded on the left. This encoding is referred to as "big-endian". Of course, other embodiments of the extraction means PE in which a different logic is used with a different word encoding are feasible.

The encoding means CM allow encoding of the pixels, particularly as a function of their color, their transparency etc. Generally, a color encoded in a certain number of bits (this is the size of a pixel) is associated with each pixel. A color has three characteristics, namely red, green and blue defined by the Commission Internationale de l'Éclairage (CIE). However, for allowing a homogeneous composition of the image, with a view to display on the screen of the television system, each pixel is encoded. The color of a pixel is thus encoded by means of a color look-up table. The color of a pixel is encoded in 24 bits in this case. In accordance with a non-limitative embodiment, the encoding means CM comprise at least two color look-up tables and preferably comprise as many color look-up tables as there are different types of patterns, the character pattern not included, and preferably a color expansion table and a transparency table ABT. Due to these different tables, it will be possible to encode pixels of different sizes.

As is shown in the example of FIG. 3, a non-limitative embodiment comprises types of patterns whose pixels have a size of 1, 2, 4 or 8 bits. The encoding means CM comprise a first color look-up table LUT2 allowing conversion of the pixels of 2 bits into pixels of 24 bits, a second color look-up table LUT4 allowing conversion of the pixels of 4 bits into pixels of 24 bits, a third color look-up table LUT8 allowing conversion of pixels of 8 bits into pixels of 24 bits, a fourth color expansion table LUT1 allowing conversion of pixels of one bit, for example, pixels coming from character patterns, into pixels of 24 bits by attributing one color to them, and finally a fifth transparency table ABT allowing attribution of transparency coefficients between different patterns that may be superimposed on the screen, which coefficients are referred to as "alpha blending coefficients". Of course, an encoding other than that for 24 bits may be used. In this case, the encoding means CM comprise corresponding tables.

The control means CNTRL control these encoding means CM by indicating to them the different codes to be associated with an extracted pixel, i.e. the color or expansion table to be associated, the color to be associated for the expansion table and/or the transparency coefficient to be associated. It will be noted that a character pattern has no color so that the control means CNTRL attribute one to them. Encoding means CM may encode only one pixel at a time, therefore the integrated circuit CH preferably comprises N encoding means CM, with N>1. Consequently, it is possible to encode several pixels in parallel. This has the advantage that the time to process a pattern is reduced. As it is shown in the example of FIG. 4, there are two encoding means CM I and CM II for processing several pixels in parallel.

In a third step, the control means CNTRL sort the pixels coming from the encoding means CM in order to avoid that the pixels coming from different patterns do mix. The switching means X-BAR receive the different pixels coming from the encoding means CM and switch the pixels thus sorted to the adequate queuing means LFIFO. These switching means are, for example, multipliers or interconnection networks referred to as "crossbars". The switching means X-BAR switch the pixels of the same pattern to the same queuing means LFIFO. In accordance with the example of FIG. 4, the pixels of a first pattern are thus switched to the first queuing means LFIFO1 , while the pixels of a second pattern will be switched to the second queuing means LFIFO2 . Preferably, the number of queuing means LFIFO corresponds to the number of encoding means CM.

In accordance with the embodiment illustrated in FIG. 4, when there are at least two encoding means CM, the integrated circuit CH preferably comprises delay means R which are suitable for delaying the sorting and switching of one pixel with respect to another. Said delay means are, for example, a delay register R arranged between the second encoding means CM II and the pixel switching means X-BAR. This register R has the advantage that it prevents two pixels coming from the same pattern from squashing each other when they are switched to the queuing means LFIFO corresponding to said pattern, thus to the same means LFIFO.

Let us take an example in which a first pattern M1 comprises four pixels P1 , P2 , P3 and P4 of 8 bits each. As it can be seen in FIG. 5, during a first clock pulse CLK1 , the first and second pixels P1 and P2 are extracted at the output of the memory RAM by virtue of the extraction means PE. At the second clock pulse CLK2 , said pixels P1 and P2 are encoded in parallel by the two encoding means CM I and CM II, while the third and fourth pixels are extracted by the extraction means PE. At the third clock pulse CLK3 , only the first pixel P1 is sorted by the control means CNTRL which recognize that it belongs to the first pattern M1, and is switched by the switching means X-BAR to the first queuing means LFIFO1 . The delay register R delays the sorting and switching of the second pixel P2 with respect to the first pixel P1 . Consequently, it is not until the fourth clock pulse CLK4 that the control means sort the second pixel P2 and that the switching means X-BAR switch it to the first queuing means LFIFO1 . By virtue of the delay register R, the first and second pixels P1 and P2 are thus not switched simultaneously to the same queuing means LFIFO1 and thus do not squash each other, which would happen without the presence of said register R.

However, there is still a last problem. In accordance with the example of FIG. 5, if the four pixels P1, P2, P3 and P4 belong to the same first pattern M1, the second pixel P2 and the extracted third pixel P3 will also squash each other at the third clock pulse CLK3. To solve this second problem of pixels squashing each other, the control means CNTRL control the reading of the pixels of the different patterns in the volatile memory RAM, the reading being interlaced in several of said patterns. To this end, M consecutive reading operations of the pixels for M different patterns are performed, where M is the number of encoding means CM existing in the integrated circuit CH. Consequently, in accordance with the example of FIG. 6, if there are two encoding means, two consecutive reading operations are performed on the pixels for two different patterns. Thus the first and second pixels P1 and P2 of a first pattern M1 are extracted during a first clock pulse CLK1 and the first and second pixels P3 and P4 of a second pattern M2 are extracted during a second clock pulse CLK2. During a fourth clock pulse CLK4 , there is no squashing because the second pixel P2 of the first pattern M1 is switched to the first queuing means LFIFO1 and the first pixel P3 of the second pattern M2 is switched to the second queuing means LFIFO2, and so forth.

Finally, when the set of pixels of one or several patterns has been processed in accordance with the method described hereinbefore, the different patterns are sent during a last step to the composing means CO. Said composing means CO composes the image to be displayed, on the one hand, with the image coming from the external memory (not shown) and, on the other hand, with said patterns coming from the volatile memory RAM in accordance with known techniques described in U.S. patent Ser. No. 09/333,633 filed on Jun. 15, 1999. The video output co-processor eventually displays the image thus composed on the screen.

The invention described thus has the advantage that it avoids management of the set of patterns at the level of a processor or co-processor for processing video images and thus avoids an overload of the data bus connected to the processor and co-processor, or also avoid cluttering of the passband. The patterns are now managed at the level of the video output co-processor. Moreover, the integrated circuit comprises only one memory. This has the advantage that the size of the integrated circuit can be reduced with respect to other circuits comprising several memories and, consequently, several memory interfaces (memory access means) which are necessary for their operation, which interfaces also occupy much space on a circuit. Finally, the fact that the pixels can be processed in parallel, as we have seen hereinbefore, without increasing the clock rate has the advantage that a memory can be used which is less rapid and thus less costly than other memories.

It must be understood that the scope of the invention is by no means limited to the embodiment described.

The invention is neither limited to the field of television but may also apply to other fields notably to those using an LCD color screen such as future portable telephone systems or organizers.

What is claimed is:

1. An integrated circuit (CH) for processing sets of data, said sets of data having pixels, wherein the integrated circuit comprises:

an only one memory (RAM) suitable for saving at least a set of data having a number of pixels having a size varying from one type of set to another, means (CNTRL) for controlling pixels, suitable for giving an indication of the type of a set of data, and means (PE) for extracting pixels, suitable for selecting and reading said set of data, extracting at least a pixel of said set of data at the output of said memory (RAM) as a function of said indication, and dispatching said at least one pixel to encoding means (CM).

2. The integrated circuit of claim 1, wherein the encoding means (CM) has at least two color look-up tables (LUT).

3. The integrated circuit of claim 1, further comprising N encoding means (CM) with N>1.

4. The integrated circuit of claim 1, wherein the control means (CNTRL) are suitable for sorting pixels coming from the encoding means (CM).

5. The integrated circuit of claim 1, further comprising switching means (X-BAR) suitable for switching the pixels of the same set of data to the same queuing means (LFIFO).

6. The integrated circuit of claim 5, further comprising delay means (R) suitable for delaying the switching of one pixel with respect to another pixel.

7. The integrated circuit of claim 1, wherein the control means (CNTRL) control the reading of the pixels of different sets of data in the memory (RAM), said reading being interlaced in several of said sets of data.

8. Video output co-processor comprising an integrated circuit (CH) for processing sets of data as claimed in claim 1.

9. Television system comprising an integrated circuit (CH) for processing sets of data as claimed in claim 1.

10. A method of processing different sets of data, the different sets of data comprising pixels, wherein the method comprises the steps of:

saving in an only one memory (RAM) of an integrated circuit at least a set of data with a number of pixels having a size varying from one type of set to another, giving an indication of the type of a set of data, selecting and reading said set of data, extracting at least a pixel of said set of data at the output of said memory as a function of said indication, and dispatching said at least one pixel to encoding means (CM).

11. The method of claim 10, wherein the encoding means (CM) has at least two color look-up tables (LUT).

12. The method of claim 10, wherein the method uses N encoding means (CM) with N>1.

13. A The method of claim 10, further comprising a supplementary step of sorting pixels coming from the encoding means (CM).

14. The method of claim 10, further comprising a supplementary step of switching the pixels of the same set of data to the same queuing means (LFIFO).

15. The method of claim 10, further comprising a supplementary step of delaying the switching of one pixel with respect to another pixel.

16. The method of claim 10, wherein the reading of the pixels of different sets of data is interlaced in several of said sets of data.

17. The method of claim 10, wherein the steps are performed by an integrated circuit (CH).

* * * * *